US011543547B2

(12) United States Patent
Kim et al.

(10) Patent No.: US 11,543,547 B2
(45) Date of Patent: Jan. 3, 2023

(54) EARLY EARTHQUAKE DETECTION APPARATUS AND METHOD

(71) Applicant: POSTECH Research and Business Development Foundation, Pohang-si (KR)

(72) Inventors: Dai Jin Kim, Pohang-si (KR); Jong Hoon Park, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 17/168,066

(22) Filed: Feb. 4, 2021

(65) Prior Publication Data

US 2021/0247531 A1    Aug. 12, 2021

(30) Foreign Application Priority Data

Feb. 7, 2020   (KR) ..................... 10-2020-0014977
Jan. 25, 2021  (KR) ..................... 10-2021-0009881

(51) Int. Cl.
*G01V 1/00* (2006.01)
*G06F 17/18* (2006.01)
*G06N 3/04* (2006.01)

(52) U.S. Cl.
CPC .............. *G01V 1/008* (2013.01); *G06F 17/18* (2013.01); *G06N 3/0472* (2013.01)

(58) Field of Classification Search
CPC ....... G01V 1/008; G06F 17/18; G06N 3/0472
See application file for complete search history.

(56) References Cited

U.S. PATENT DOCUMENTS

| 7,277,797 | B1* | 10/2007 | Kunitsyn | G01V 1/008 |
| | | | | 702/15 |
| 11,169,288 | B1* | 11/2021 | Johnson | G06N 5/04 |
| 11,204,435 | B1* | 12/2021 | Thompson | G01V 1/288 |
| 2011/0255371 | A1* | 10/2011 | Jing | G01V 1/288 |
| | | | | 367/73 |

(Continued)

OTHER PUBLICATIONS

Oh, T.H. et al. "Learning-Based Video Motion Magnification". In: Ferrari V., Hebert M., Sminchisescu C., Weiss Y. (eds) Computer Vision—ECCV 2018. ECCV 2018. Lecture Notes in Computer Science, vol. 11208. 16 pages, Springer, Cham. https://doi.org/10.1007/978-3-030-01225-0_39.

(Continued)

*Primary Examiner* — Raymond L Nimox
(74) *Attorney, Agent, or Firm* — Morgan, Lewis & Bockius LLP

(57) ABSTRACT

An early earthquake detection method may comprise acquiring a frame image from a camera; acquiring a vibration signal from the frame image; removing a noise signal due to vibration of the camera from the vibration signal; acquiring a motion signal obtained by magnifying subtle motions from the noise signal-removed vibration signal; extracting vibration characteristics from the motion signal; estimating an occurrence of an earthquake by extracting a peak signal from the vibration characteristics; and determining whether an earthquake occurs by receiving earthquake estimation information from at least one other camera located within a certain range.

20 Claims, 7 Drawing Sheets

(56) References Cited

U.S. PATENT DOCUMENTS

2018/0061063 A1\* 3/2018 Buyukozturk ............ G06T 7/20
2018/0376314 A1\* 12/2018 Allen ..................... G01V 1/008

OTHER PUBLICATIONS

Kong, Q. et al. "MyShake: A smartphone seismic network for earthquake early warning and beyond", Science Advances, vol. 2, No. 2, e1501055, Feb. 12, 2016, 8 pages.

Perol, T. et al. "Convolutional neural network for earthquake detection and location", Science Advances, vol. 4, No. 2, e1700578, Feb. 14, 2018, 8 pages.

Serdar Kuyuk, H. et al. "Designing a Network-Based Earthquake Early Warning Algorithm for California: ElarmS-2", Bulletin of the Seismological Society of America, vol. 104, No. 1, Feb. 2014, pp. 162-173.

\* cited by examiner

○ Camera not detecting earthquake
● Camera detecting earthquake
☆ Estimated epicenter
$t_0$ First earthquake detection time

EARLY EARTHQUAKE DETECTION APPARATUS AND METHOD

CROSS-REFERENCE TO RELATED APPLICATIONS

This application claims priority to Korean Patent Applications No. 10-2020-0014977 filed on Feb. 7, 2020 and No. 10-2021-0009881 filed on Jan. 25, 2021 with the Korean Intellectual Property Office (KIPO), the entire contents of which are hereby incorporated by reference.

BACKGROUND

1. Technical Field

The present disclosure relates to a method and an apparatus for early detecting an earthquake, and more specifically, to a method and an apparatus for early detecting an earthquake by extracting vibration signals from real-time surveillance videos.

2. Related Art

Cases of damage caused by natural disasters are increasing. Among them, recently, cases of damage caused by earthquakes are increasing rapidly. Earthquakes not only cause economic losses to individuals and society, but also cause human damage. Accordingly, the importance of developing early earthquake detection technologies to reduce the damages by detecting earthquakes early and securing time for earthquake evacuation is increasing.

Meanwhile, the conventional earthquake detection apparatuses have a disadvantage in that they are difficult to be universalized because of they are expensive. In addition, since the conventional earthquake detection apparatus is installed at a fixed observatory far away from people's living area, it takes time to transmit an evacuation order to each major facility located within a living area radius even when an earthquake is detected.

SUMMARY

In order to solve the above-identified problems, exemplary embodiments of the present disclosure are directed to providing an apparatus and a method for early detecting an earthquake with high efficiency, high reliability, low cost, and high safety.

According to an exemplary embodiment of the present disclosure for achieving the above-described objective, an apparatus for early detecting an earthquake may comprise: a memory; and a processor executing at least one instruction stored in the memory, wherein when executed by the processor, the at least one instruction causes the apparatus to: acquire a frame image from a camera; acquire a vibration signal from the frame image; remove a noise signal due to vibration of the camera from the vibration signal; acquire a motion signal obtained by magnifying subtle motions from the noise signal-removed vibration signal; extract vibration characteristics from the motion signal; estimate an occurrence of an earthquake by extracting a peak signal from the vibration characteristics; and determine whether an earthquake occurs by receiving earthquake estimation information from at least one other camera located within a certain range.

In the acquiring of the motion signal, the at least one instruction may further cause the apparatus to: acquire a magnified frame image in which the subtle motions are magnified by a deep magnification network; and acquire the motion signal in which the vibration signal according to the subtle motions is magnified from the magnified frame image.

In the acquiring of the magnified frame image, the at least one instruction may further cause the apparatus to: input two consecutive frame images into the deep magnification network to spatially decompose each of the frame images into a shape representation and a texture expressions; magnify a difference in the shape representations of the frame images; and decode the magnified difference and the texture representation to obtain the magnified frame image with the magnified subtle motions.

In the extracting of the vibration characteristics, an interquartile range (IRQ) representing a 50% amplitude range of the motion signal, a zero crossing (ZC) representing a number of times the motion signal crosses a base line 0, and a cumulative absolute velocity (CAV) that is a cumulative measurement of amplitudes of the motion signal over a time period may be calculated.

The IQR and ZC may be used as information for discriminating seismic motions or non-seismic motions, and the CAV may be used as information for increasing an accuracy of discriminating the seismic motions.

In the estimating of an occurrence of an earthquake, the at least one instruction may further cause the apparatus to: calculate a probability distribution of a peak signal by inputting the vibration characteristics to a deep learning-based deep seismic classification network, and output the earthquake estimation information by using the peak signal as one of a P-wave, S-wave, or noise signal according to the calculated probability distribution.

The deep seismic classification network may consist of down-sampling and up-sampling using convolutions using a ReLU activation function.

In the determining of whether an earthquake occurs, the at least one instruction may further cause the apparatus to: cluster the at least one other camera located within the certain range, and receive individual earthquake estimation information from the at least one other camera, and determine whether an earthquake occurs from the earthquake estimation information.

The at least one instruction may further cause the apparatus to calculate earthquake parameters by analyzing the at least one earthquake estimation information.

The earthquake parameters may include at least one of an arrival time of the earthquake, an epicenter of the earthquake, and a magnitude of the earthquake.

According to another exemplary embodiment of the present disclosure for achieving the above-described objective, a method for early detecting an earthquake may comprise: acquiring a frame image from a camera; acquiring a vibration signal from the frame image; removing a noise signal due to vibration of the camera from the vibration signal; acquiring a motion signal obtained by magnifying subtle motions from the noise signal-removed vibration signal; extracting vibration characteristics from the motion signal; estimating an occurrence of an earthquake by extracting a peak signal from the vibration characteristics; and determining whether an earthquake occurs by receiving earthquake estimation information from at least one other camera located within a certain range.

The acquiring of the motion signal may further comprise: acquiring a magnified frame image in which the subtle motions are magnified by a deep magnification network; and acquiring the motion signal in which the vibration signal according to the subtle motions is magnified from the magnified frame image.

The acquiring of the magnified frame image may further comprise: inputting two consecutive frame images into the deep magnification network to spatially decompose each of the frame images into a shape representation and a texture expressions; magnifying a difference in the shape representations of the frame images; and decoding the magnified difference and the texture representation to obtain the magnified frame image with the magnified subtle motions.

In the extracting of the vibration characteristics, an inter-quartile range (IRQ) representing a 50% amplitude range of the motion signal, a zero crossing (ZC) representing a number of times the motion signal crosses a base line 0, and a cumulative absolute velocity (CAV) that is a cumulative measurement of amplitudes of the motion signal over a time period may be calculated.

The IQR and ZC may be used as information for discriminating seismic motions or non-seismic motions, and the CAV may be used as information for increasing an accuracy of discriminating the seismic motions.

The estimating of an occurrence of an earthquake may further comprise: calculating a probability distribution of a peak signal by inputting the vibration characteristics to a deep learning-based deep seismic classification network, and outputting the earthquake estimation information by using the peak signal as one of a P-wave, S-wave, or noise signal according to the calculated probability distribution.

The deep seismic classification network may consist of down-sampling and up-sampling using convolutions using a ReLU activation function.

The determining of whether an earthquake occurs may further comprise: clustering the at least one other camera located within the certain range, and receiving individual earthquake estimation information from the at least one other camera, and determining whether an earthquake occurs from the earthquake estimation information.

The method may further comprise calculate earthquake parameters by analyzing the at least one earthquake estimation information.

The earthquake parameters may include at least one of an arrival time of the earthquake, an epicenter of the earthquake, and a magnitude of the earthquake.

The early earthquake detection apparatus and method according to the exemplary embodiments of the present disclosure detect occurrence of an earthquake early based on images acquired from pre-installed camera(s), so that a separate facility for earthquake detection is not required, and thus low-cost early earthquake detection is made possible.

In addition, since the early earthquake detection apparatus and method have no restrictions on measurement locations for earthquake detection, a quick evacuation order may be transmitted when an earthquake occurs to reduce human damage caused by the earthquake. Accordingly, early earthquake detection with high efficiency and high safety is made possible.

DETAILED DESCRIPTION OF THE EMBODIMENTS

Figure 1:
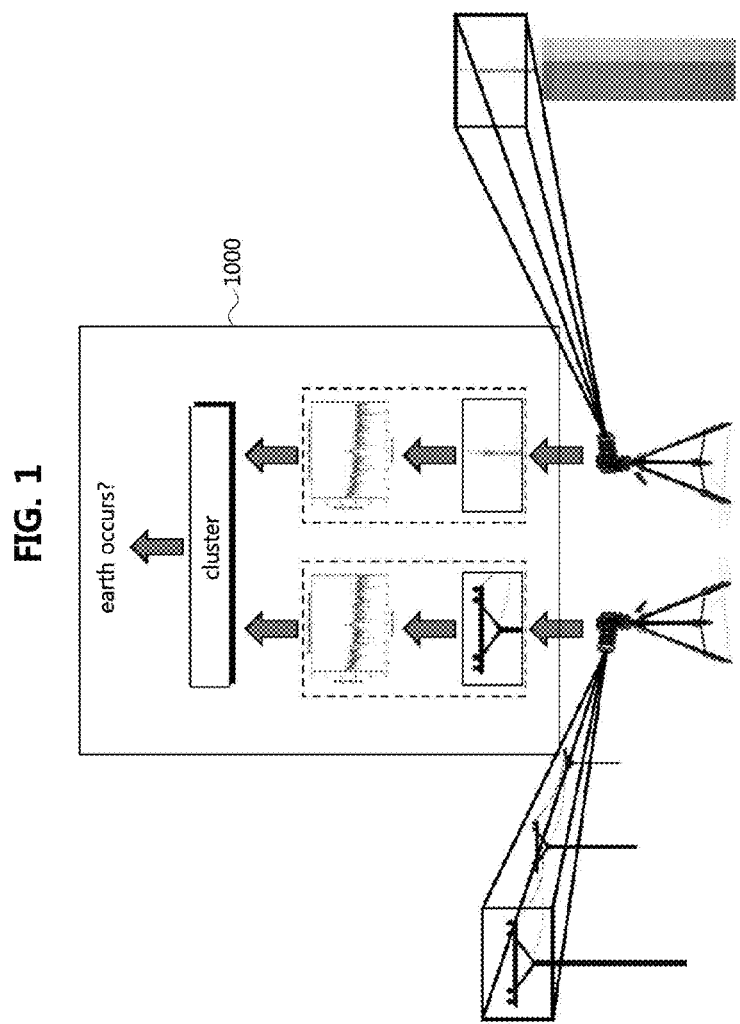
FIG. 1 is a conceptual diagram for describing an operation of an early earthquake detection apparatus according to an exemplary embodiment of the present disclosure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the exemplary embodiments of the present disclosure, in order to facilitate an overall understanding, the same reference numerals are used for the same elements in the drawings, and duplicate descriptions for the same elements are omitted.

FIG. 1 is a conceptual diagram for describing an operation of an early earthquake detection apparatus according to an exemplary embodiment of the present disclosure.

Referring to FIG. 1, an early earthquake detection apparatus 1000 may acquire a plurality of frame images from at least one camera that is previously installed indoors or outdoors and continuously photographs a specific point. Accordingly, the early earthquake detection apparatus 1000 may early detect presence or absence of an earthquake by extracting vibration signals from the frame images and extracting earthquake parameters from a plurality of vibration signal clusters.

Figure 2:
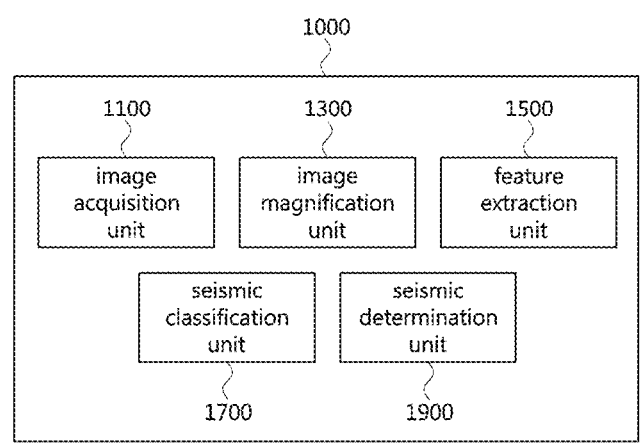
FIG. 2 is a block diagram illustrating an early earthquake detection apparatus according to an exemplary embodiment of the present disclosure.

FIG. 2 is a block diagram illustrating an early earthquake detection apparatus according to an exemplary embodiment of the present disclosure.

Referring to FIG. 2, the earthquake detection apparatus 1000 may comprise an image acquisition unit 1100, an image magnification unit 1300, a feature extraction unit 1500, a seismic classification unit 1700, and a seismic determination unit 1900.

The image acquisition unit 1100 may acquire a plurality of frame images captured from at least one camera pre-installed outdoors or indoors. Accordingly, the image acquisition unit 1100 may receive, from the at least one camera, a plurality of frame images obtained by photographing a specific point. For example, the camera may be a CCTV camera that is fixedly installed at a specific location and continuously photographs a specific point.

According to an exemplary embodiment, the image acquisition unit 1100 may acquire a plurality of frames photographing a specific point 1 m to 2 m away from each camera having a resolution of 740×480 and a frame rate of 30 frames per second (FPS). According to another exemplary embodiment, the image acquisition unit 1100 may acquire a plurality of frame images photographing a specific point located within 75 m from each high-speed camera having a resolution of 1240×960 and a frame rate of 2,200 FPS.

The frame images photographing a specific point may be images photographing a lightning rod of a building or a telephone pole, but are not limited thereto, and may be frame images photographing at least one subject that is easy to observe subtle vibrations. In addition, the image acquisition unit 1100 may analyze vibration changes over time of the plurality of frame images obtained from the at least one camera by using machine learning, and obtain vibration information from accelerometer(s) attached to the camera(s).

Thereafter, the image acquisition unit 1100 may obtain information on vibrations of the frame images caused by external forces by removing vibration noises caused by movements of the camera(s).

Figure 3:
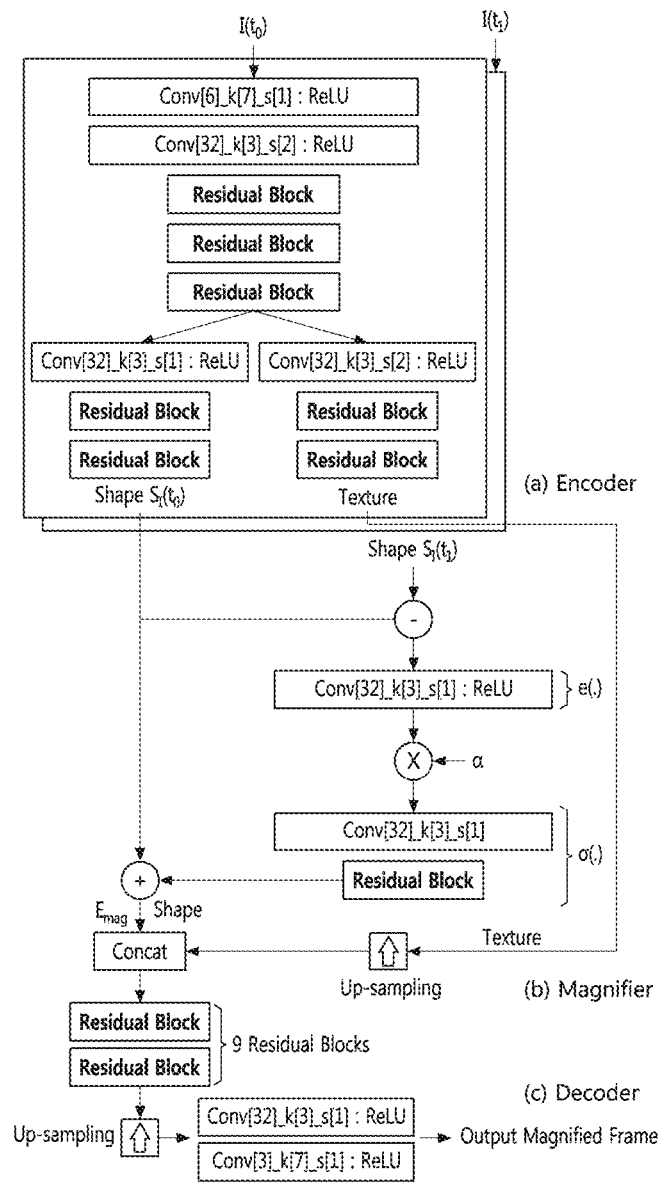
FIG. 3 is a block diagram illustrating a deep magnification network model according to an exemplary embodiment of the present disclosure.

FIG. 3 is a block diagram illustrating a deep magnification network model according to an exemplary embodiment of the present disclosure.

Referring to FIG. 3, the image magnification unit 1300 may magnify subtle motions in the plurality of frame images from a deep magnification network model to which a deep learning algorithm is applied. In more detail according to an exemplary embodiment, the deep magnification network model may be composed of three blocks: an encoder, a magnifier, and a decoder.

The encoder may allow two consecutive frame images (e.g., $I(t_0)$ and $I(t_1)$) input to the deep magnification network model to pass through two convolutional layers and three residual blocks, respectively, so that they are spatially-decomposed into two components.

Thereafter, the encoder may allow each of the decomposed components to pass through one convolutional layer and two residual blocks, thereby obtaining a shape representation and a texture representation from each component. In this case, a normalization loss function in the convolutional layer used to obtain the shape representation and the texture representation may be applied differently for each component.

For example, the encoder may obtain the shape representation of individually decomposed parameters from two consecutive frame images (e.g., $I(t_0)$ and $I(t_1)$) by using Equation 1 below.

$$S = E_{shape}(I(T_0)) \quad \text{[Equation 1]}$$

Here, $I(t_0)$ is frame image at a time $t_0$. In addition, the encoder may obtain the texture representation of parameters individually decomposed from two consecutive frame images (e.g., $I(t_0)$ and $I(t_1)$) by using Equation 2 below.

$$T = E_{texture}(I(T_0)) \quad \text{[Equation 2]}$$

Here, $I(t_0)$ is frame image at a time $t_0$. The encoder may down-sample the plurality of input frame images, thereby reducing the number of parameters and memory usage as well as reducing noises. The magnifier may be trained in an end-to-end manner, and may magnify a difference in the respective shape representations obtained from the encoder, and transmit the difference to the decoder to be described later.

More specifically, the magnifier may receive, from the encoder, the shape representations decomposed from two consecutive frame images, calculate the difference in the respective shape representations as in Equation 3, and magnify it by a specific amplification factor $\alpha$ to amplify the subtle motions in the decomposed image. Here, the magnification factor $\alpha$ may be set to a specific coefficient in advance.

$$E_{mag}(S_{I(t_0)}, S_{I(t_1)}, \alpha) = S_{I(t_0)} + \sigma(\alpha \cdot e(S_{I(t_0)} - S_{I(t_1)})) \quad \text{[Equation 3]}$$

$I(t_n)$: frame image at a time $t_0$
$I(t_0)$: frame image at a time $t_0$.
$\alpha$: magnification factor
$e(\cdot)$: convolutional layer using 3×3 ReLU
$\sigma(\cdot)$: 3×3 convolutional layer and 3×3 residual blocks The magnifier of the deep magnification network model may identify and magnify subtle motions, and thus it is not affected by larger motions in the surroundings, such as generation of artifacts by the camera, thereby enabling high-accuracy seismic vibration analysis with noises removed.

The decoder may combine the shape representations and texture representations decomposed and magnified by the encoder and the magnifier into one image. Thereafter, the decoder may pass the combined image through 9 residual blocks, upscale it, and pass it through two convolutional blocks to obtain a frame image in which motions are globally magnified. The decoder may generate a global motion magnification signal and transmit it to the feature extraction unit 1500 to be described later.

Referring back to FIG. 2, the feature extraction unit 1500 may extract vibration information such as an inter-quartile range (IQR), a cumulative absolute velocity (CAV), and a zero crossing (ZC) from the plurality of frame images whose motions are magnified by the image magnification unit 1300. Here, the IQR may be an amplitude parameter representing a 50% amplitude range of the global motion signal, the CAV may be a cumulative measurement of the amplitudes of the component of the motion signal over several time periods, and the ZC may be the number of times the global motion signal crosses a baseline 0.

Accordingly, the feature extraction unit 1500 may discriminate seismic motion and non-seismic motion using the IQR measuring the amplitude and the ZC measuring the frequency, and provide additional information for increasing the accuracy of seismic motion discrimination using the CAV.

The seismic classification unit 1700 may calculate probability distributions of a S-wave and a P-wave from the plurality of frame images by using a deep seismic classification network model, and determine whether the corresponding vibration is noise.

Figure 4:
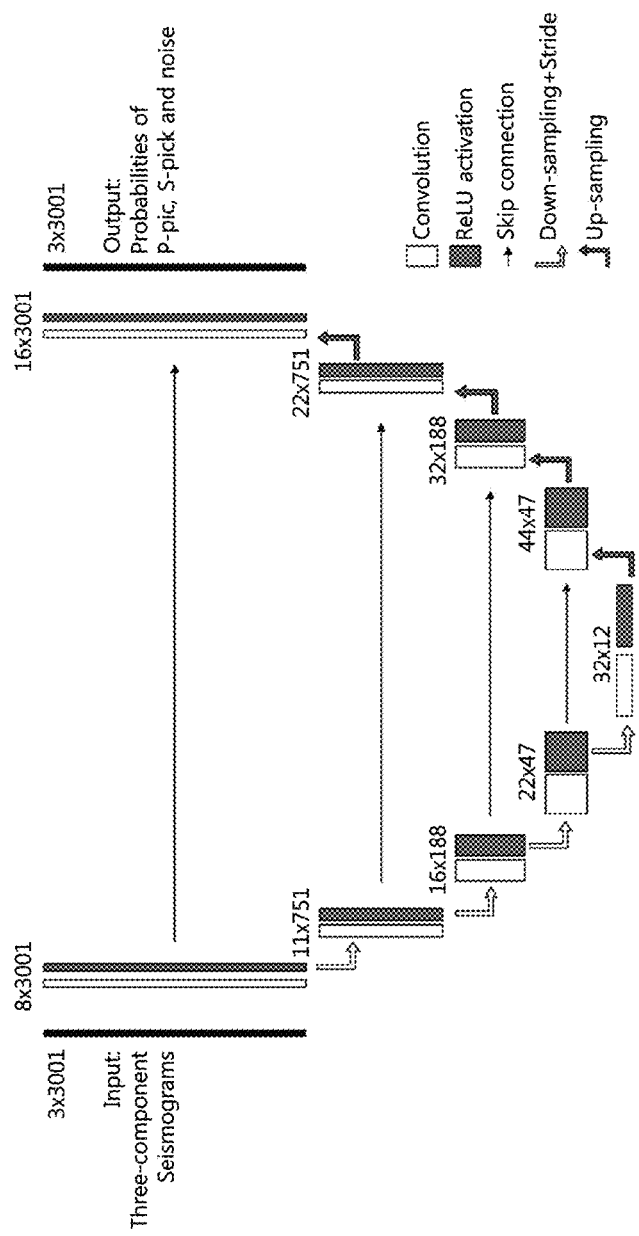
FIG. 4 is a structural diagram of a deep seismic classification network model of an early earthquake detection apparatus according to an exemplary embodiment of the present disclosure.

FIG. 4 is a structural diagram of a deep seismic classification network model of an early earthquake detection apparatus according to an exemplary embodiment of the present disclosure.

Referring to FIG. 4, the seismic classification unit 1700 may input the IQR, CAV, and ZC values received from the feature extraction unit 1500 into the deep seismic classification network model. To explain more specifically about the deep seismic classification network model, the deep seismic classification network model may be provided in a U-net structure having down-sampling based on convolutions using a ReLU activation function and a stride of four points and up-sampling based on deconvolutions. In addition, the convolutional layer and deconvolutional layers belonging to the same layer are connected by skip connection.

The deep seismic classification network model may be a model pre-trained to receive the IQR, CAV, and ZC values obtained by using information on the frame images with magnified motions, artificially generated human motions or noise vibrations, P-wave and S-wave information for structures installed on a seismic plate, and existing seismic detection data, and to output P-pick, S-pick, and output noise information of the corresponding vibration wave.

The deep seismic classification network may use a softmax, a natural exponential function normalized in the last layer, and may provide a probability distribution for P-wave, S-wave, and noise as shown in Equation 4 below.

$$c_i = \frac{e^{z_i(x)}}{\sum_{k=1}^{3} e^{z_k(x)}}$$ [Equation 4]

i=1: Noise
i=2: P-wave
i=3: S-wave
z(x): Output value of the last layer, which is not normalized In this case, the loss function of the deep seismic classification network may be a ground-truth probability distribution p(x), as shown in Equation 5 below, and may be a cross entropy with an estimated probability distributions c(x).

$$L(p, c) = -\sum_{i=1}^{3}\sum_{p_i} p_{i(x)} \log c_{i(x)}$$ [Equation 5]

Figure 5:
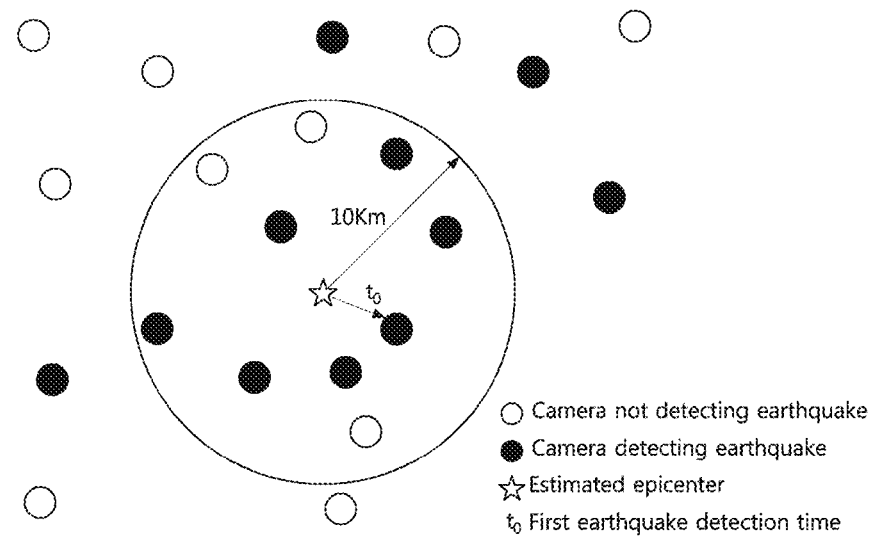
FIG. 5 is a conceptual diagram for describing an operation of the seismic determination unit of the early earthquake detection apparatus according to an exemplary embodiment of the present disclosure.

FIG. 5 is a conceptual diagram for describing an operation of the seismic determination unit of the early earthquake detection apparatus according to an exemplary embodiment of the present disclosure.

Referring to FIG. 5, the seismic determination unit 1900 may cluster earthquake trigger information obtained from a plurality of cameras to obtain earthquake parameters such as an epicenter, a magnitude, and an arrival time of an actual earthquake. In this case, the magnitude of the earthquake on the cluster basis may be obtained using Equation 6 below.

$$M = 1.352 \times \log(PCA) + 1.658 \times \log(d) + 4.858$$ [Equation 6]

PCA: A peak cumulative acceleration defined as the maximum CAV within a temporal window
d: Distance between a camera location and an estimated epicenter, which is the center of the cluster According to an exemplary embodiment, the seismic determination unit 1900 may determine that an earthquake has occurred when more than 60% of cameras within a cluster radius of 10 Km detect the earthquake, and issue an earthquake alarm, thereby decreasing the number of false positive error detections and providing high-reliability information.

Figure 6:
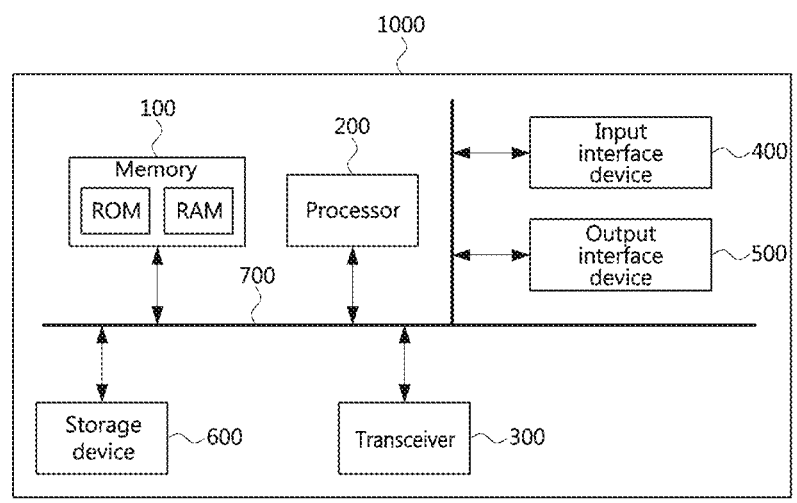
FIG. 6 is a block diagram illustrating an early earthquake detection apparatus according to an exemplary embodiment of the present disclosure.

The software configurations of the early earthquake detection apparatus of the present disclosure have been described above. In FIG. 6, hardware configurations of the early earthquake detection apparatus will be described in more detail.

FIG. 6 is a block diagram illustrating an early earthquake detection apparatus according to an exemplary embodiment of the present disclosure.

Referring to FIG. 6, the early earthquake detection apparatus 1000 may include at least one processor 200, and a memory 100 storing at least one instruction executable by the at least one processor 200. In addition, the early earthquake detection apparatus 1000 may include a transceiver 300 connected to a network to perform communication, an input interface device 400, an output interface device 500, a storage device 600, and the like. The components included in the early earthquake detection apparatus 1000 may be connected by a bus 700 to communicate with each other.

Each of the memory 100 and the storage device 600 may be configured as at least one of a volatile storage medium and a nonvolatile storage medium. For example, the memory 100 may be configured with at least one of a read only memory (ROM) and a random access memory (RAM).

The memory 100 may store at least one instruction executed by the processor 200. According to an exemplary embodiment, the at least one instruction may cause the apparatus 1000 to: acquire a frame image from a camera; acquire a vibration signal from the frame image; remove a noise signal due to vibration of the camera from the vibration signal; acquire a motion signal obtained by magnifying subtle motions from the noise signal-removed vibration signal; extract vibration characteristics from the motion signal; estimate an occurrence of an earthquake by extracting a peak signal from the vibration characteristics; and determine whether an earthquake occurs by receiving earthquake estimation information from at least one other camera located within a certain range.

The processor 200 may refer to a central processing unit (CPU), a graphic processing unit (GPU), or a dedicated processor in which methods according to the exemplary embodiments of the present disclosure are performed.

As described above, the processor 200 may execute at least one instruction stored in the memory 100. According to an exemplary embodiment, the processor 200 may execute at least one of the aforementioned at least one software components according to at least one instruction stored in the memory 100.

The operation of the processor 200 that executes at least one instruction will be described in more detail in the description of the early earthquake detection method using the early earthquake detection apparatus according to the exemplary embodiment of the present disclosure in FIG. 7 to be described later.

Figure 7:
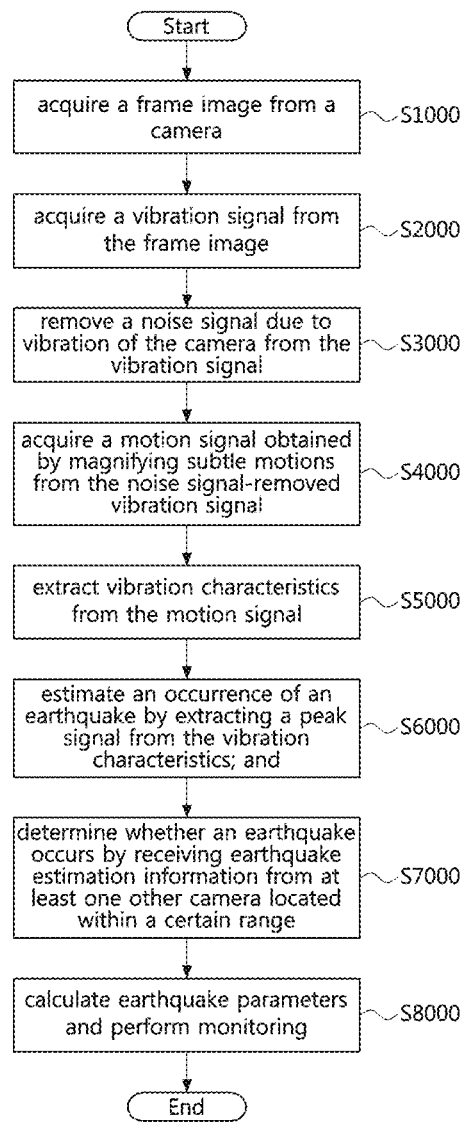
FIG. 7 is a flow chart for describing an early earthquake detection method according to an exemplary embodiment of the present disclosure.
Figure 8:
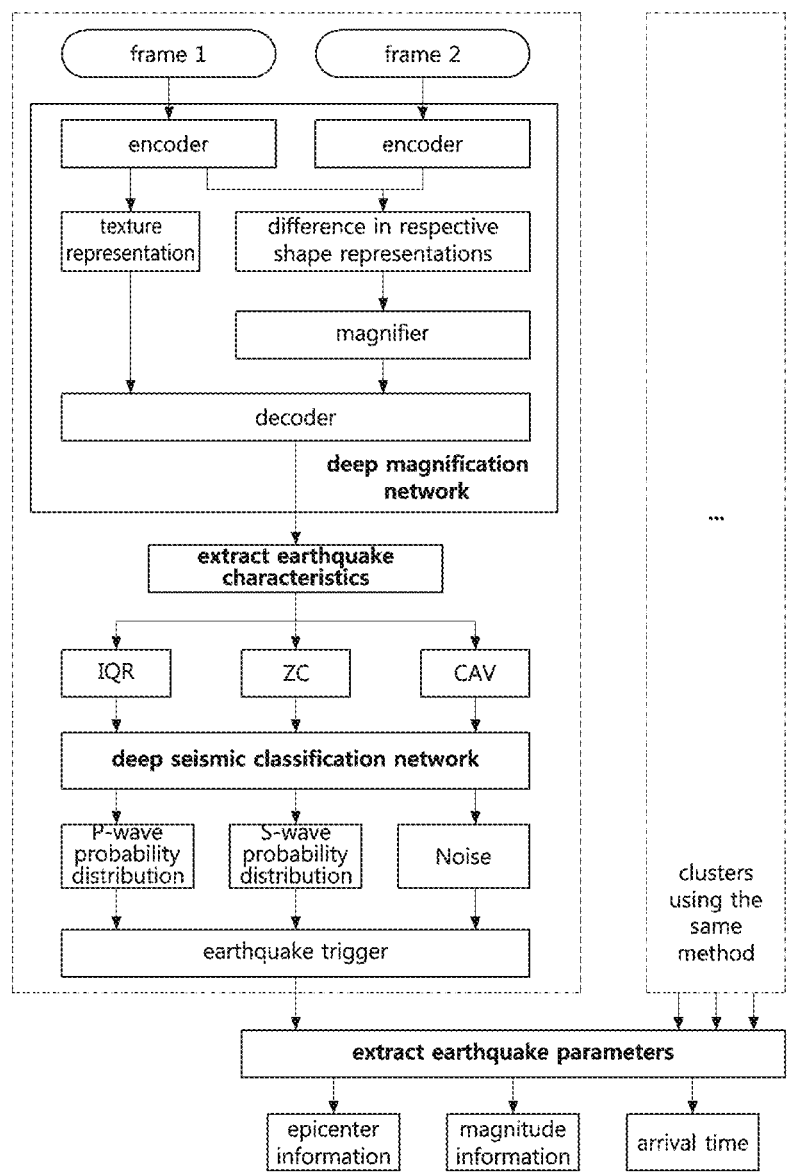
FIG. 8 is a block diagram illustrating an early earthquake detection method according to an exemplary embodiment of the present disclosure.

FIG. 7 is a flow chart for describing an early earthquake detection method according to an exemplary embodiment of the present disclosure, and FIG. 8 is a block diagram illustrating an early earthquake detection method according to an exemplary embodiment of the present disclosure.

Referring to FIGS. 7 and 8, the processor 200 may acquire frame image(s) from at least one camera by executing the image acquisition unit 1100 (S1000). Here, each of the at least one camera may be a camera previously installed for crime prevention, etc., and may be, for example, a CCTV camera.

In this case, the processor 200 may acquire vibration signals by analyzing motions in the at least one frame image by machine learning (S2000).

Thereafter, the processor 200 may acquire vibration information from an accelerometer attached to the camera, and remove the vibration information of the camera from the analyzed vibration signals of the at least one frame image. In other words, the processor 200 may remove noise signals due to camera vibration from the vibration signals of the at least one frame image by executing the image acquisition unit 1100 (S3000).

The processor 200 may execute the image amplification unit 1300 to obtain a motion signal in which subtle motions are magnified from the frame image whose noise signals have been removed, which was acquired from the image acquisition unit 1100 (S4000).

According to an exemplary embodiment, the processor 200 may amplify the subtle motions in the frame image received from the image acquisition unit 1100 by using a deep magnification network based on deep learning of the image magnification unit 1300.

More specifically, the processor 200 may spatially decompose a texture representation acquired from the frame image obtained from one camera and a shape representation obtained from a difference in consecutive two frame images in a magnified shape representation. Thereafter, the processor 200 may obtain a magnified frame image by decoding the difference of the magnified shape representation and texture representation.

In this case, the deep magnification network may output a motion signal magnified by excluding a vibration signal according to large motions generated by an external force in the frame image, and identifying a vibration signal according to subtle motions. Accordingly, the processor 200 may enable a high-precision and high-reliability early earthquake detection apparatus capable of precise analysis of subtle vibrations caused by an early earthquake by secondary removal of noises caused by an external force.

The processor 200 may extract vibration characteristics from the motion signal received from the image magnification unit 1300 by executing the feature extraction unit 1500 (S5000).

According to an exemplary embodiment, the processor 200 may extract IQR, CAV, and ZC from the magnified motion signal of the frame image. Here, the IQR and ZC may be information for discriminating seismic motion and non-seismic motion, and the CAV may be information for increasing the discrimination accuracy of seismic motion.

The processor 200 may execute the seismic classification unit 1700 to input the extracted IQR, CAV, and ZC into the pre-trained deep seismic classification network.

Thereafter, the processor 200 may output a probability distribution of a peak signal from the deep seismic classification network, and classify whether a P-wave, S-wave, or noise signal is present from the output probability distribution (S6000). In other words, the processor 200 may estimate whether or not an earthquake occurs from the vibration characteristics by the seismic classification unit 1700 based on the deep seismic classification network model.

The processor 200 may execute the seismic determination unit 1900 to determine whether an earthquake has occurred from the earthquake estimation information, which is the output of the deep seismic classification network model and individually obtained from each of clusters of a plurality of cameras installed within a certain range (S7000).

According to an exemplary embodiment, when earthquake occurrence signals are detected in more than 60% of the earthquake estimation information, which is the output of the deep seismic classification network model and individually obtained from each of clusters of a plurality of cameras installed within a certain range, the processor 2000 may determine that an earthquake has occurred by the earthquake determination unit 1900.

Thereafter, the processor 200 may algorithmically analyze the plurality of earthquake estimation information to calculate and monitor at least one earthquake parameter information, such as an arrival time, an epicenter, and a magnitude of the earthquake (S8000).

In the above, an early earthquake detection apparatus and method according to exemplary embodiments of the present disclosure have been described.

The early earthquake detection method may comprise: acquiring a frame image from a camera; acquiring a vibration signal from the frame image; removing a noise signal due to vibration of the camera from the vibration signal; acquiring a motion signal obtained by magnifying subtle motions from the noise signal-removed vibration signal; extracting vibration characteristics from the motion signal;

estimating an occurrence of an earthquake by extracting a peak signal from the vibration characteristics; and determining whether an earthquake occurs by receiving earthquake estimation information from at least one other camera located within a certain range. The early earthquake detection apparatus and method according to the exemplary embodiments of the present disclosure detect occurrence of an earthquake early based on images acquired from pre-installed camera(s), so that a separate facility for earthquake detection is not required, and thus low-cost early earthquake detection is made possible. In addition, since the early earthquake detection apparatus and method have no restrictions on measurement locations for earthquake detection, a quick evacuation order may be transmitted when an earthquake occurs to reduce human damage caused by the earthquake. Accordingly, early earthquake detection with high efficiency and high safety is made possible.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

Although the present disclosure has been described with reference to preferred embodiments, it will be apparent to those skilled in the art that the present disclosure may be variously changed and modified without departing from the spirit and scope of the invention defined in the following claims.

What is claimed is:

1. An apparatus for early detecting an earthquake, the apparatus comprising:
   a memory; and
   a processor executing at least one instruction stored in the memory,
   wherein when executed by the processor, the at least one instruction causes the apparatus to:
   spatially decompose two consecutive frame images of a plurality of frame images from a camera into two components;
   obtain a shape representation and a texture representation from each of the two components;
   calculate a difference in the respective shape representations;
   amplify subtle motions in the decomposed image by magnifying the difference by a specific amplification factor;
   combine texture representations obtained from each of the two components and amplified shape representations into one image;
   acquire a frame image in which motions are globally magnified by passing the combined image through convolutional blocks, the motions being generated as a global motion magnification signal;
   extract vibration characteristics of a motion signal by measuring an amplitude and a frequency of the global motion magnification signal; and
   calculate probability distributions of a peak signal extracted from the vibration characteristics using a pre-learned model to estimate an occurrence of an earthquake.

2. The apparatus according to claim 1, wherein the at least one instruction further causes the apparatus to:
   down-sample the plurality of frame images to reduce the number of parameters, memory usage and noise.

3. The apparatus according to claim 1, wherein the at least one instruction further causes the apparatus to:
   pass the combined image through residual blocks to upscale the combined image, and pass the upscaled combined image through two convolutional blocks to obtain the frame image in which motions are globally magnified.

4. The apparatus according to claim 1, wherein in the extracting of the vibration characteristics, an inter-quartile range (IRQ) representing a 50% amplitude range of the motion signal, a zero crossing (ZC) representing a number of times the motion signal crosses a base line 0, and a cumulative absolute velocity (CAV) that is a cumulative measurement of amplitudes of the motion signal over a time period are calculated.

5. The apparatus according to claim 4, wherein the IQR and ZC are used as information for discriminating seismic motions or non-seismic motions, and the CAV is used as information for increasing an accuracy of discriminating the seismic motions.

6. The apparatus according to claim 4, wherein the at least one instruction further causes the apparatus to:
   perform estimating an occurrence of an earthquake using a deep seismic classification network model when a seismic motion is discriminated by the IRO and the ZC,
   wherein the peak signal is outputted as one of a P-wave, S-wave, or noise signal according to the calculated probability distribution.

7. The apparatus according to claim 6, wherein the deep seismic classification network model consists of down-sampling and up-sampling based on convolutions using a convolution layer and a ReLU activation function, and skip connections which connect a convolutional layer and a deconvolutional layer belonging to the same layer, respectively.

8. The apparatus according to claim 1, wherein the at least one instruction further causes the apparatus to:
   cluster earthquake trigger information obtained from a plurality of cameras located within a certain range, and receive individual earthquake estimation information from the plurality of the cameras, and
   determine whether an earthquake occurs from the earthquake estimation information.

9. The apparatus according to claim 8, wherein the at least one instruction further causes the apparatus to:
calculate earthquake parameters by analyzing the at least one earthquake estimation information.

10. The apparatus according to claim 9, wherein the earthquake parameters include at least one of an arrival time of the earthquake, an epicenter of the earthquake, and a magnitude of the earthquake.

11. A method for early detecting an earthquake, the method comprising:
spatially decomposing, by an encoder, two consecutive frame images of a plurality of frame images from a camera into two components through an encoder;
obtaining, by the encoder, a shape representation and a texture representation from each of the two components;
calculating, by a magnifier connected to the encoder, a difference in the respective shape representations;
amplifying, by the magnifier, subtle motions in the decomposed image by magnifying the difference by a specific amplification factor;
combining, by a decoder connected to the encoder and the magnifier, texture representations obtained from each of the two components and amplified shape representations into one image;
acquiring, by the decoder, a frame image in which motions are globally magnified by passing the combined image through convolutional blocks, wherein the motions globally magnified is generated as a global motion magnification signal;
extracting vibration characteristics of a motion signal by measuring an amplitude and a frequency of the motion signal received from the decoder; and
calculating probability distributions of a peak signal extracted from the vibration characteristics using a pre-learned model to estimate an occurrence of an earthquake.

12. The method according to claim 11, further comprising down-sampling, by the encoder, the plurality of frame images to reduce the number of parameters, memory usage and noise.

13. The method according to claim 11, wherein the decoder passes the combined image through residual blocks to upscale the combined image, and passes the upscaled combined image through two convolutional blocks to obtain the frame image in which motions are globally magnified.

14. The method according to claim 11, wherein in the extracting of the vibration characteristics, an inter-quartile range (IRQ) representing a 50% amplitude range of the motion signal, a zero crossing (ZC) representing a number of times the motion signal crosses a base line 0, and a cumulative absolute velocity (CAV) that is a cumulative measurement of amplitudes of the motion signal over a time period are calculated.

15. The method according to claim 14, wherein the IQR and ZC are used as information for discriminating seismic motions or non-seismic motions, and the CAV is used as information for increasing an accuracy of discriminating the seismic motions.

16. The method according to claim 14, wherein estimating an occurrence of an earthquake is performed using a deep seismic classification network model when a seismic motion is discriminated by the IRQ and the ZC, and
wherein the peak signal is outputted as one of a P-wave, S-wave, or noise signal according to the calculated probability distribution.

17. The method according to claim 16, wherein the deep seismic classification network model consists of down-sampling and up-sampling based on convolutions using a convolution layer and a ReLU activation function, and skip connections which connect a convolutional layer and a deconvolutional layer belonging to the same layer, respectively.

18. The method according to claim 11, further comprising:
clustering earthquake trigger information obtained from a plurality of cameras located within a certain range, and receiving individual earthquake estimation information from the plurality of the cameras; and
determining whether an earthquake occurs from the earthquake estimation information.

19. The method according to claim 18, further comprising calculating earthquake parameters by analyzing the at least one earthquake estimation information.

20. The method according to claim 19, wherein the earthquake parameters include at least one of an arrival time of the earthquake, an epicenter of the earthquake, and a magnitude of the earthquake.

* * * * *